United States Patent
Rusu et al.

(10) Patent No.: US 8,907,932 B2
(45) Date of Patent: Dec. 9, 2014

(54) SYSTEMS AND METHODS FOR ASSESSING THE AUTHENTICITY OF DYNAMIC HANDWRITTEN SIGNATURE

(75) Inventors: Mircea Sorin Rusu, Bucharest (RO); Adrian Dinescu, Bucharest (RO); Stefan Stelian Diaconescu, Bucharest (RO)

(73) Assignee: Softwin S.R.L., Bucharest (RO)

( * ) Notice: Subject to any disclaimer, the term of this patent is extended or adjusted under 35 U.S.C. 154(b) by 336 days.

(21) Appl. No.: 13/504,198

(22) PCT Filed: Oct. 21, 2010

(86) PCT No.: PCT/RO2010/000017
§ 371 (c)(1),
(2), (4) Date: Apr. 26, 2012

(87) PCT Pub. No.: WO2011/112113
PCT Pub. Date: Sep. 15, 2011

(65) Prior Publication Data
US 2012/0212459 A1    Aug. 23, 2012

(30) Foreign Application Priority Data

Oct. 26, 2009  (RO) .................................... 09-00867

(51) Int. Cl.
*G06F 3/0354*    (2013.01)
*G06K 9/00*    (2006.01)
*G06K 9/22*    (2006.01)

(52) U.S. Cl.
CPC ........ *G06K 9/00154* (2013.01); *G06F 3/03545* (2013.01); *G06K 9/222* (2013.01)
USPC ..... 345/179; 345/158; 178/19.01; 178/19.03; 178/19.05

(58) Field of Classification Search
CPC ... G06F 3/0317; G06F 3/0321; G06F 3/0542; G06F 3/03545; G06F 3/0386
USPC ..................... 345/179, 158; 178/19.01–19.05
See application file for complete search history.

(56) References Cited

U.S. PATENT DOCUMENTS 6,897,854 B2    5/2005  Cho et al.
7,176,906 B2    2/2007  Williams et al.
(Continued)

FOREIGN PATENT DOCUMENTS

EP    1 229 488 A2    8/2002
EP    1 846 868 A1    10/2007
(Continued)

OTHER PUBLICATIONS

International Preliminary Report on Patentability and Written Opinion from PCT/R02010/000017 dated May 1, 2012 (10 pages).
(Continued)

*Primary Examiner* — Lun-Yi Lao
*Assistant Examiner* — Kelly B Hegarty
(74) *Attorney, Agent, or Firm* — Osha Liang LLP

(57) ABSTRACT

A system includes an electronic pen, functionally integrated with a personal computer for the acquisition and processing of signals associated with signatures, which can be network connected together with other personal computers. Each personal computer has connected as peripherals an electronic pen that includes two groups of inertial accelerometers that capture kinetic data and data about contact microvibrations with the writing support. The electronic pen also includes one self-referential optical navigation sensor that captures a series of data pairs, as momentary movements necessary in the reconstruction of the trajectory of the electronic pen and which, together with the kinetic data captured by the set of inertial accelerometers, represents personal computer input data for sensorial fusion processing and for creating the conditions to extract the information from the sensorial and psychomotric representation of a user's perspective.

7 Claims, 7 Drawing Sheets

System's physical modules.

Functional diagram of signature capture module – pen.

(56) References Cited

U.S. PATENT DOCUMENTS

| | | | |
|---|---|---|---|
| 7,342,575 | B1 | 3/2008 | Hartwell et al. |
| 7,433,499 | B2 | 10/2008 | Kim |
| 7,483,018 | B2 | 1/2009 | Oliver |
| 7,508,384 | B2 | 3/2009 | Zhang et al. |
| 2002/0035687 | A1* | 3/2002 | Skantze .................... 713/168 |
| 2002/0163510 | A1 | 11/2002 | Williams et al. |
| 2002/0163511 | A1 | 11/2002 | Sekendur |
| 2003/0214490 | A1 | 11/2003 | Cool |
| 2004/0140965 | A1 | 7/2004 | Wang et al. |
| 2005/0039015 | A1* | 2/2005 | Ladanyi et al. ............ 713/176 |
| 2007/0127096 | A1* | 6/2007 | Larsen et al. .................. 359/2 |
| 2008/0152202 | A1* | 6/2008 | Moise et al. ................ 382/120 |
| 2008/0180410 | A1 | 7/2008 | McCall et al. |
| 2008/0204429 | A1* | 8/2008 | Silverbrook et al. ......... 345/179 |
| 2009/0115744 | A1 | 5/2009 | Zhang et al. |
| 2009/0182527 | A1* | 7/2009 | Wiebe et al. ................ 702/150 |
| 2013/0009907 | A1* | 1/2013 | Rosenberg et al. ........... 345/174 |

FOREIGN PATENT DOCUMENTS

| | | |
|---|---|---|
| RO | 121497 B1 | 6/2007 |
| WO | 03/017185 A1 | 2/2003 |
| WO | 2006085783 A1 | 8/2006 |

OTHER PUBLICATIONS

A. Chalechale et al. "Arabic/Persian cursive signature recognition and verification using line segment distribution," International Conference on Information and Communication Technologies: From Theory to Applications, Jan. 2004, (4 pages).

Bin Li et al. "Online signature verification based on null component analysis and principal component analysis," Pattern Analysis and Applications, Springer-Verlag, Lo, vol. 8, No. 4, Feb. 2006 (12 pages).

Madabusi S. et al. "On-line and off-line signature verification using relative slope algorithm," Measurement Systems for Homeland Security, Contraband Detection and Personal Safety Workshop, Mar. 29, 2005 (5 pages).

Tappert C. et al. "The State of the Art in On-Line Handwriting Recognition," IEEE Transactions on Pattern Analysis and Machine Intelligence, vol. 12, No. 8, Aug. 1990 (22 pages).

International Search Report from PCT/R02010/000017 dated Jan. 23, 2012 (7 pages).

Haukijarvi et al. "Accelerometer Vibration Analysis in Finding Out Velocities of Pen Input Device", 10th European Signal Processing Conference, Jan. 1, 2000, (4 pages).

* cited by examiner

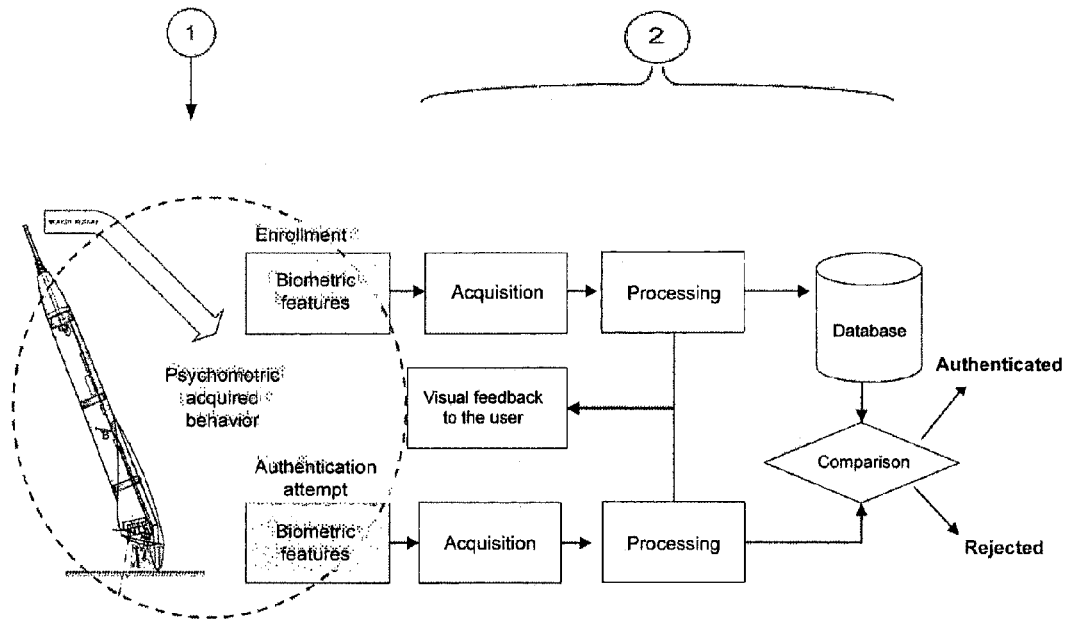
Fig. 1 – System's functional diagram.
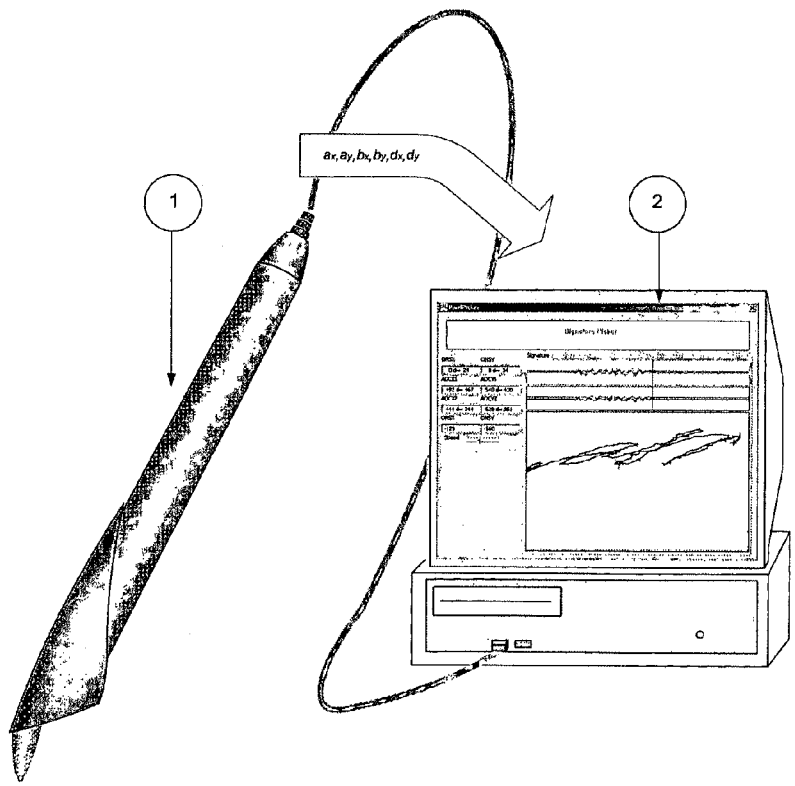
Fig. 2 – System's physical modules.

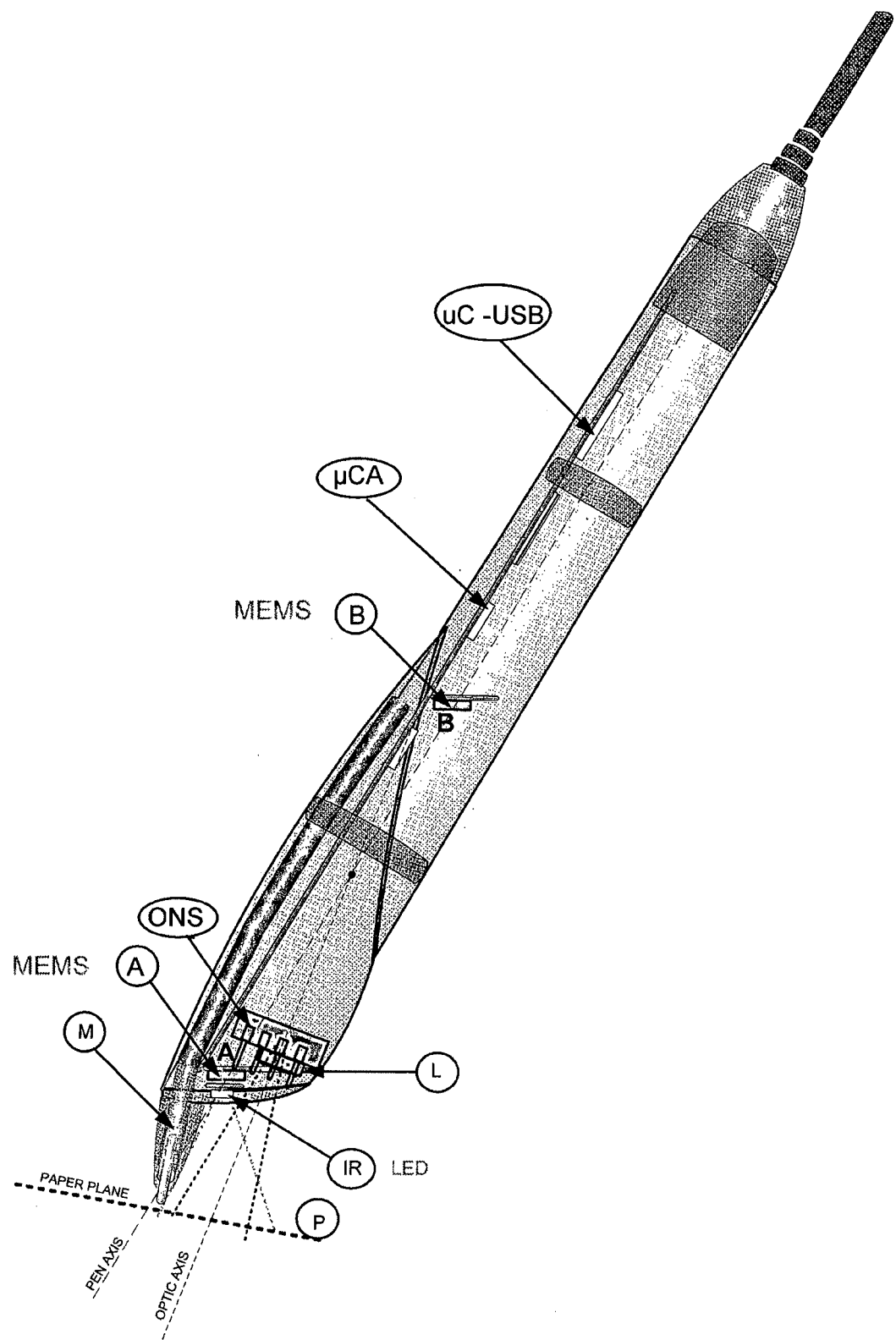
Fig. 3 – Signature capture mode diagram – pen.

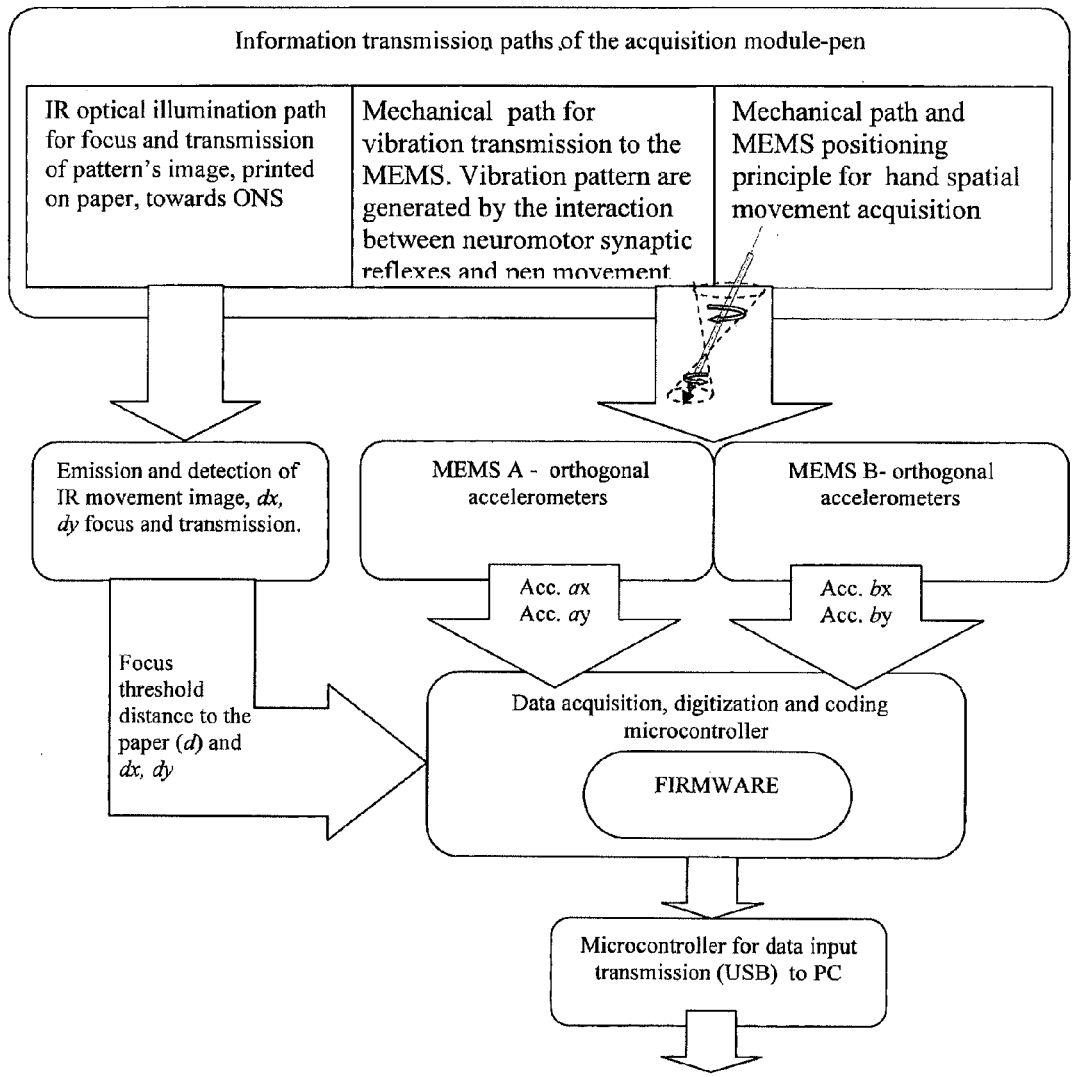
Fig.4 – Functional diagram of signature capture module – pen.

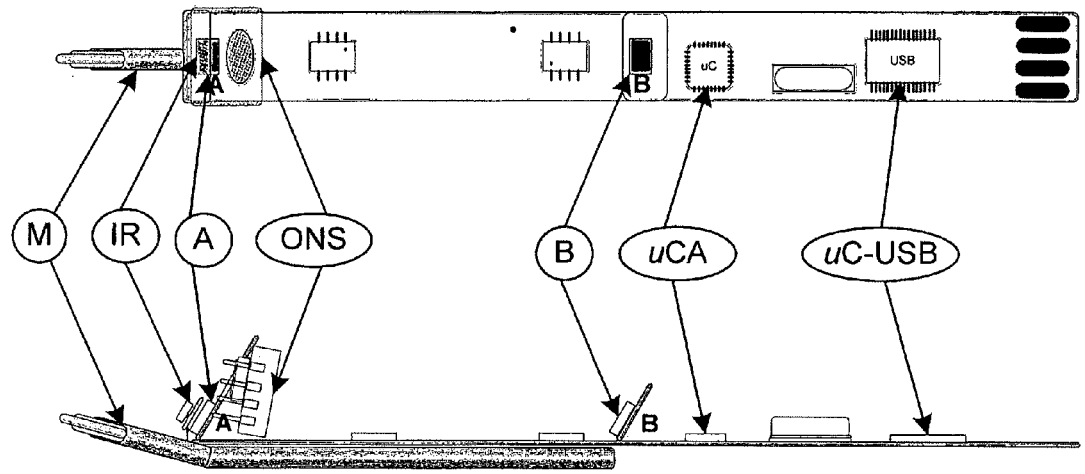
Fig. 5 – ONS, MEMS A, MEMS Topology, pen refill.
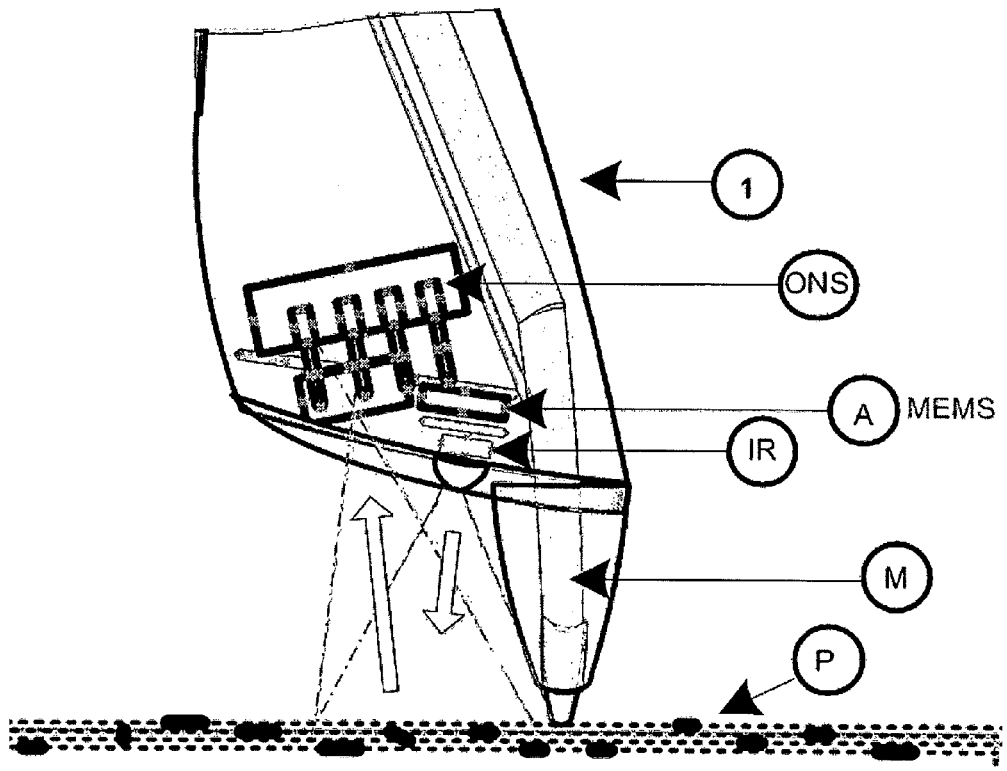
Fig.6 – Topological detail from pen module.

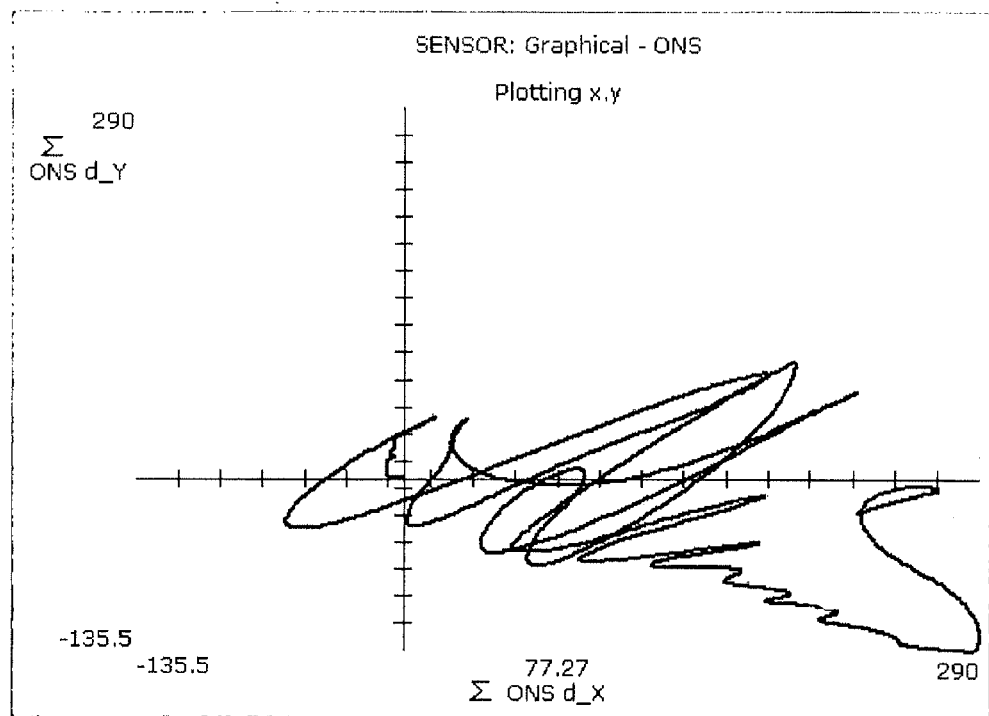
Fig. 7 - Reconstruction of the entire trajectory described by the pen.
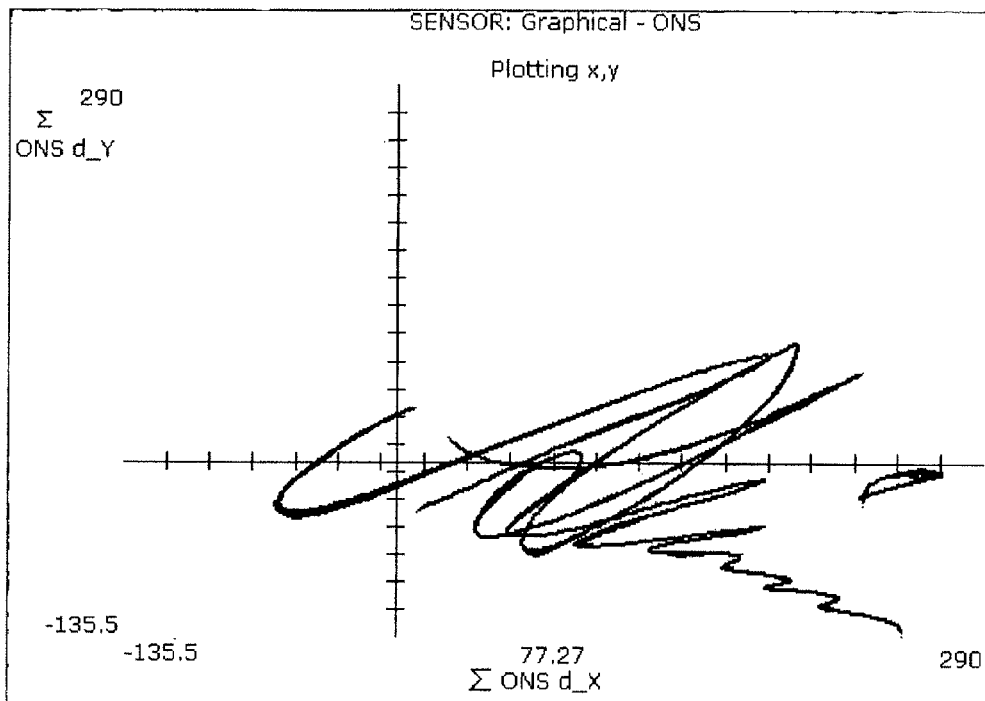
Fig. 8 - Reconstruction of the graphic trajectory in the contact moments with the paper.

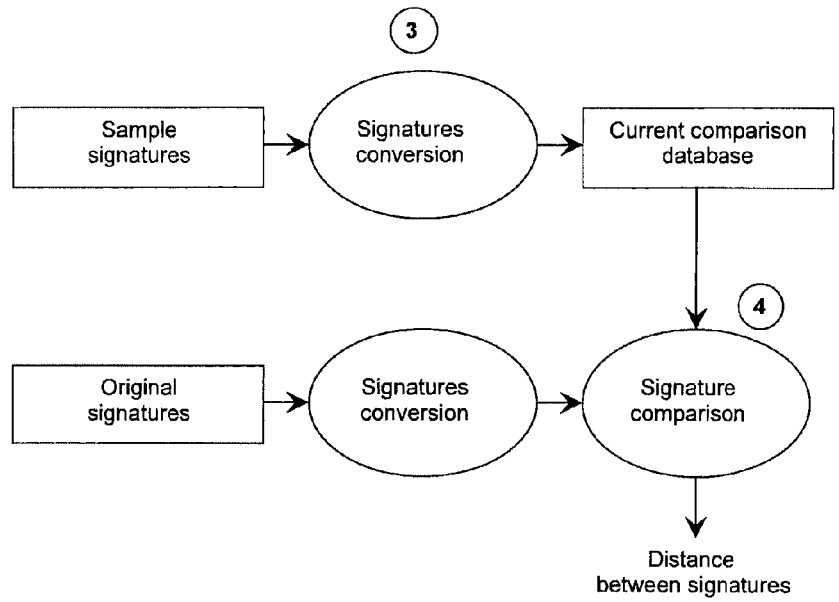
Fig. 9 - General framework of signature conversion and comparison.
| Algorithm | Processed signals | | | | | | Number of dimensions |
|---|---|---|---|---|---|---|---|
| | $a_x$ | $a_y$ | $b_x$ | $b_y$ | $d_x$ | $d_y$ | |
| SRA3 | | | | | * | * | 2 |
| SRA5 | * | * | * | * | | | 2 |
| SRA7 | * | * | * | * | * | * | 6 |
| SRA8 | * | * | * | * | | | 4 |
Fig. 10 – Summary of analysis algorithms of the signature.

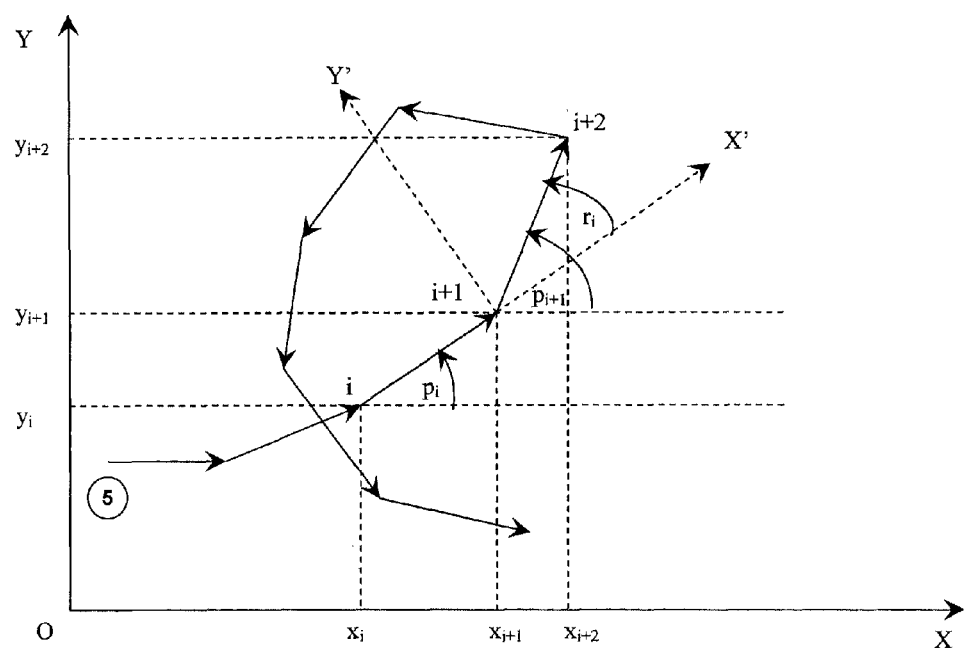
Fig. 11 – Determination of the slope differences between two consecutive segments of a plane curve represented by points.

SYSTEMS AND METHODS FOR ASSESSING THE AUTHENTICITY OF DYNAMIC HANDWRITTEN SIGNATURE

BACKGROUND OF THE INVENTION

1. Field of the Invention

The invention refers to an interactive computer system and methods for the acquisition and processing of the bio-kinetic information of the signature for the assessment of dynamic handwritten signature authentication. It has applicability in the field of behavioral biometrics, in situations where there is user interest to validate his will by a handwritten signature.

2. Description of the Related Art

It is generally accepted that, in the procedures of declared identity validation of a person, in addition to the administrative, physiological biometrics, computer based methods and technologies, there can be used, as a supplementary link, other methods and technologies that belong to behavioral biometrics field. The acquisition and recognition of handwritten signature constitutive elements represent a class in behavioral biometrics.

In the RO 141297 and EP 1846868 patents, described here by reference, there are already developed an acquisition solution and processing methods of the dynamic information (accelerations) associated to the signing process in order to verify the handwritten signature. The information is captured, processed and compared by a computer-based system. The acquisition of acceleration signals by inertial accelerometers—MEMS, integrated into an electronic pen, and the specific topology of placing the sensors, facilitate not only the acquisition of spatial-kinetic information, but also the acquisition of contact microvibrations generated at the paper level. The processing methods on acquired acceleration signals determine:

the starting and finishing points of the signature, a method realized through algorithmic data processing, which represents the variation in time of a threshold distance to the paper combined with the variation of the frequency and amplitude parameters of the contact microvibrations generated by the subject/pen/paper interaction, Invariant sequences associated with the initial acceleration signals and invariant sequences associated with the derived components of initial acceleration signals.

the distance between two signatures by algorithmic comparison of the sets of invariant sequences using two different methods.

the final result is determined through a decision method in which targeted subjects' samples and other subjects' samples registered in the signatures database take part through the results of comparisons with the input signature.

The system and methods in RO 141297 and EP 1846868 patent deal with special kinetic phenomena combined with contact microvibrations by processing the accelerations captured by the accelerometers—MEMS. However, this process has the disadvantage of not including both the capture and the processing of graphic information which, if combined with kinetic information by sensorial fusion, it would increase the system's accuracy and the quality of man-machine interaction. The present invention aims to eliminate the disadvantages mentioned by incorporating, along with the inertial accelerometers—MEMS, an optical navigation sensor, considering the conditions of the sensorial fusion concept. This optimization is used graphically and kinetic, on the one hand, in the new algorithmic, multimodal processing methods of the captured signals, and, on the other hand, for the achievement of a visual feedback for the user along with the advantages described, further on, in detail.

U.S. Pat. No. 7,176,906 B2 (Microsoft Corporation) patent presents a method of interpreting the handwriting thickness using electronic methods based on ballistic movements. In order to capture the information, it is used a pen with (incorporated) accelerometer/accelerometers. For proper interpretation of the information, it is used "the pulse width variation provided by the accelerometer or the pen's angle of inclination." This method implies the use of a pen that contains accelerometers. However, it does not contain any element for the direct description of its graphic trajectory. The method suggests, in order to associate the information regarding the handwriting thickness with the trajectory of the pen, the use of complex and expensive external devices of graphic tablet type. The specific issues of handwriting signature are not discussed there.

In contrast with the above-mentioned patent, the present invention contains a signature capture module of pen type, which integrates, by sensorial fusion, not only accelerometers, but also an optical navigation sensor having the purpose of capturing the graphic trajectory. The topological concept of sensor integration in the pen is essentially defined to guarantee the spatial synchronism of the accelerometers' axes with the axes of optical navigation sensor. The functional integration of both categories of sensors in the pen ensures the synchronization in time of the acquisition of the two types of data: accelerations and self-referential movements. The information acquisition's space-time synchronism is the principle that governs the sensorial fusion, whose application in this invention produces a better accuracy in the signature authentication. The function of thickness handwriting interpretation is defined and based, not only on the variation of contact microvibrations frequency, but also on their amplitude variation as an effect of dynamic pressure that occurs between the pen and paper in handwriting.

U.S. Pat. No. 7,433,499 B2 (DynaSig Corporation) patent describes a signature authentication and acquisition system which contains accelerometers and pressure sensors incorporated in the writing device, the authentication method being achieved by data encryption and by comparing code results, thus avoiding the storage of unencrypted samples. The patent does not deal with any information about the graphic nature of the writing device or the authentication method.

U.S. Pat. No. 7,483,018 (Microsoft Corporation) patent describes both a system and a dual method for graphic data input, of pen type, in which the reference pattern, analyzed by the integrated image sensor, is the source that generates absolute or relative coordinates, depending on the implementation option and the context of use. System generates graphic or position data, but it does not include components and methods for handwritten signature authentication. The fact that the accelerometers are not integrated in the capture module (in this case, a pen) reduces the applicability in signature authentication.

U.S. Pat. No. 7,508,384 B2 (Data Research Inc.) patent describes a system and a method of acquisition and recognition of hand movement when writing on a surface—"Digital Writing System." Kinetic spatial data capture is performed using a 3-axis gyroscope, a 3-axis accelerometer integrated in the pen and a proximity sensor related to the writing support. The patent does not describe capture sensors for graphic information nor algorithmic methods of signature authentication. 3D trajectory data are estimated indirectly by dynamic linear filtering based on Kalman estimator (filter).

The procedures requiring handwritten signature verification are outlined and applied using concepts, principles and customs belonging to social and legal sciences, behavioral psychology and human neurophysiology. Electronics and information technology contribute to improve the security of checking procedures by means of acquisition, processing and recognition of signals and signature forms.

The usability, the accommodation and acceptance degree from the user of the biometric procedure are the essential elements, defined in literature [http://www.biometrics.org], used as arguments to the classification of biometric technologies. Most people would prefer the biometry of the handwritten signature to other biometric methods. The signature is, first of all, considered a personalized and individualized means of self-protection due to its social utility and personal perception. The justification lies in the individualized nature of the motric phenomenon produced in handwriting—an acquired reflex, linked to self-interest and free will. The fact that the present invention deals with the acquisition and processing of signals specific in the psychomotricity of the signature, by maintaining the paper as a support, or any other material with similar texture, offers a high degree of acceptance and accommodation.

While making a signature, the user's forearm stands on elbow, on a horizontal desk so that only the palm and the fingers perform the spatial and dynamic gesture associated with the production of the signature. In this context, a self-referential optical navigation sensor (ONS), located in the pen, quasi-parallel with the writing plan and near the tip of the pen, has, as reference for navigation, quasi-uniform spread elements of the pattern printed on paper/support. The lens (L) captures the dynamic image of pattern's elements by projection on the photosensitive area of the optical navigation sensor. The visual field of the lens covers a quasi constant area that contains sufficient pattern elements so that the ONS sensor to determine the relative movements (reported to its own coordinate axes x, y) from a previous time moment. Based on the differences between consecutive images, internally sampled by ONS from the continuous image, the sensor generates pairs of relative movements $d_x$, $d_y$, at a constant period of time, in a milliseconds scale, controlled and synchronized by the microcontroller placed in the pen, with the capture and the analog to digital conversion of acceleration signals (see RO 141297 and EP 1846868), sensed by MEMS A and MEMS B sensors. As a result, a computerized graphic representation of the ONS sensor trajectory is similar to the graphic made by the pen's refill tip. The graphic differences between the representations of ONS trajectory and the graphics made by the pen's refill represent a morphism of the same motric phenomenon, caused by the dynamic inclinations of the pen. The morphism individualizes biometrically the signature. Moreover, due to the synchronization between the graphics done on paper and the trajectory's capture through the ONS sensor, the sequential events that make up the two representations—the trace left on paper by the pen's refill and the electronic trajectory captured by the system—can be electronically stored, including the trajectory's segments where the pen's refill tip does not touch the writing support. In these situations when the execution of the signature implies momentary liftings of the pen from the paper and the amplitude of these liftings is small enough, of millimeters or even smaller, the optical navigation sensor continues to focus on the pattern elements printed on the writing paper and also continues to capture the trajectory. System continues to acquire the information produced in these sequences (when the pen does not touch the paper) because it contributes to the signature's individualization. This information is part of the signature and is handled by the processing and graphic display module, firstly, by displaying it in order to achieve visual and kinetic apperception by the user and, secondly, by calligraphic screening and processing as segments that do not need display in order to achieve graphical view.

Handwritten signature is a psychomotric act. Psychomotricity is defined as being the result of the integration of motric and mental functions, under the effect of the nervous system's maturation, and regards the report between the subject and his body. Psychomotricity is therefore not only an ability, but also a complex function adjustment of the individual behavior, including the participation of various psychomotric functions and processes that provide both data reception and proper execution of the response act.

As J. Piaget [Theory of Cognitive Development—1952] claims, the motric and the psychic are not two distinct categories, one subject of pure thought and the other subject of physical and physiological mechanisms, but the bipolar expression of a single process, namely that of efficient and flexible accommodation to external conditions. Between the external conditions of the motric act and the subjective conditions, the act of signing is not only a mechanism of execution, but also a loop circuit in which every stage, every detail of the operation is the immediate expression of the relations established between individual and environment, respectively between individual's will, psychomotrically manifested by semi-acquired reflexes, and the support of will's projection, in this case, the writing paper, where the signature is performed.

The fact that a signature is produced with a writing device, which is practically one with the subject during performance, guided the inventive principle towards the capture of the motric variables principle (accelerations and relative movements) by self-referential sensors incorporated in the pen (the writing device), thereby emulating the non-intruding integration of the sensors "in the subject". The self-referential concept transposes into practice the need of a close connection between the observer (sensors) and the psychometric act, thus capturing the data from subject's sensory motor perspective, in the context in which the purpose is to observe and to assess the individuality of the psychomotric act—the subject's signature. The writing paper has standardized qualitative properties, relatively constant, which is why the expression of individuality through the signature's motric act will be affected in a low extend by the potential differences in the quality of the paper.

The set of trajectory's attributes, captured by ONS sensor, along with the sequencing and spatial gestures captured by the accelerometers MEMS, are elements that, made by subject's free will, individualizes the signature.

From the user's point of view, the role of integrating the visual feedback into the system is dual:

it favors the cognitive mechanisms of gestical apperception, providing the user with the possibility of acquiring, through practice and visualization, complex gestures, unwritten on paper, but belonging to signature's kinetics. The user can deliberately create these acquired gestures for an additional individualization of the signature, it facilitates the user's accommodation with the specificity of the system, due to the combination between psychomotric mechanisms and display.

The consistency and complexity of the signature's gestures, naturally acquired in time or through practice, are limited only by the motric abilities and by user's ingenuity to compose, by gestical elements, a signature as individualized as possible.

BRIEF SUMMARY OF THE INVENTION

The present invention refers to a system of data acquisition and processing associated to the dynamic handwritten signature, made on writing paper support or any other material with similar texture, that has printed a quasi-uniform pattern, the system containing an electronic pen provided with two groups of inertial accelerometers MEMS to capture the kinetic data and also data about contact microvibrations with the support, integrated into a personal computer for the acquisition and processing of the signals associated to the signatures, which can be network connected together with other personal computers, each one having connected as peripherals an electronic pen composed of: a self-referential optical navigation sensor for capturing the series of data pairs ($d_x$, $d_y$), as momentary movements necessary for the reconstruction of pen's trajectory, which, together with the kinetic data ($a_x$, $a_y$, $b_x$, $b_y$) captured by a set of inertial sensors MEMS, forms the personal computer's input data for processing through sensorial fusion and for creating the conditions to extract the information from the sensorial and psychomotric representation of the user's perspective; an infrared LED to illuminate the pattern; a lens for focus and current image projection of the pattern on the sensitive area of an optical navigation sensor, positioned so that the projection of a pattern area image to be obtained on the sensitive area of the sensor, the condition of spatio-temporal synchronism required for the acquisition by sensorial fusion of the two data categories: $d_x$, $d_y$, of graphic type, and $a_x$, $a_y$, $b_x$, $b_y$ accelerations being achieved by axial and topological quasi-alignment of the three origins of the coordinate axes of MEMS sensor, of optical navigation sensor and of pen's tip, by a plane-parallel quasi-alignment topology of the sensing/coordinates axes of the three sensorial components: the two MEMS sensors and the optical navigation sensor, with the writing support plane, and by the sampling of data captured by sensors, with a constant periodicity, comprised in the domain 1-8 ms, which assure, through high frequency, the synchronism in time of the acquisition of graphic and kinetic details, the acquisition being controlled by an acquisition microcontroller which sends the information in real time to the personal computer that hosts the algorithmic methods of visualization, of writing thickness reconstruction, of processing and comparison; in order to acquire the data from the psychomotric and sensorial representation of the user's perspective, the set of MEMS sensors and the optical navigation sensor, integrated in the writing device handled by man, capturing the 6 associated signals $a_x$, $a_y$, $b_x$, $b_y$, $d_x$, $d_y$ in self-referential coordinate systems, respectively the own x, y co-ordinates axes for sensitivity; and for methods of assessing the dynamic handwriting authentication, which consist, on the one hand, of a calligraphic reconstruction and a writing thickness visualization and, on the other hand, of applying various conversions and comparisons of $a_x$, $a_y$, $b_x$, $b_y$, $d_x$, $d_y$ signals associated to the signatures to assess their authenticity.

BRIEF DESCRIPTION OF THE DRAWINGS

Further on, as an example, the invention will be described, referring also to FIGS. 1-11 that represent:

FIG. 1—System's functional block diagram,
FIG. 2—System's physical modules,
FIG. 3—Signature capture mode diagram—pen,
FIG. 4—Functional diagram of signature capture mode—pen
FIG. 5—ONS, MEMS A, MEMS B topology, pen refill,
FIG. 6—Topological detail from pen module,
FIG. 7—Reconstruction of the entire trajectory described by the pen,
FIG. 8—Reconstruction of the graphic trajectory when in contact with the paper
FIG. 9—General framework of signature conversion and comparison.
FIG. 10—Summary of analysis algorithms of the signature,
FIG. 11—Determination of the slope differences between two consecutive segments of a plane curve represented by points.

DETAILED DESCRIPTION

The system described in the present invention is physically composed of an electronic pen module 1, which integrates the sensorial assembly of acquiring data, and of a personal computer processing 2 of the data acquired by the pen through algorithmic methods.

In terms of functionality the system is shown in the block diagram in FIG. 1. System captures the motric phenomenon made by the hand-pen assembly, associated to the handwritten signature, through the sensorial fusion of two categories of signals: acceleration signals captured by MEMS A, MEMS B and movement signals captured by ONS optical navigation sensor. The specific topology regarding the sensor's distribution in pen 1 and the sampling principle of the acquired signals assure the condition of spatio-temporal synchronization between the signals of the same phenomenon. This condition is compulsory in order to achieve the concept of sensorial fusion for the multimodal algorithmic processing.

The invention deals with the self-referential capture of pen's trajectory performed by an optical navigation sensor integrated in the pen type module and with the method, firstly, of graphic display of pen's trajectory, and secondly, of calligraphic display of pen's trajectory for those segments where the pen is in dynamic contact with the paper during the performance of the signature. FIG. 7 represents the entire reconstruction of the trajectory described by the pen and FIG. 8 represents the calligraphic reconstruction, with a variable thickness associated to the dynamic contact moments of the pen's refill with the writing paper/support, for the same signature. The electronic representation on the personal computer's monitor 2 corresponds approximately to the signature's calligraphy made by the pen's refill on the writing support.

According to the invention, the methods of assessing the signature's authenticity refer to the graphic and kinetic processing and multimodal comparison of the signals associated to the signatures and will be described, in detail, in the implementation example.

The captured and displayed signals include, in the first phase of visualization on the personal computer's monitor 2, also the fragments of the signature "in the air", for instance: the differences between FIG. 7 and FIG. 8 which represent the same signature. These fragments contribute, along with those provided by the movement on the paper, to the assessment of signature's authenticity.

The psycho-motric manifestations involved in producing the signature contain elements of individuality determined by the system as invariants series and vector data, automatically evaluated through acquisition/processing/comparison methods. These methods can be added to those in RO 141297 and EP 1846868 patents whose description is included herein by reference. Moreover, the hardware structure of connection, processing and decision (computer, server) or its versions described in the previous patent (RO 141297 and EP 1846868), contains the necessary and sufficient elements for providing the running platform for the algorithmic elements that operate integrated with the pen capture type module 1) described in this invention.

According to the invention, the new concepts of signature capture, objectified in the electronic pen module and in the processing and comparison methods, are described in detail and as a unitary concept further on.

In order to capture and reconstruct the graphic trajectory of the pen, for the biometrical verification and for signature visualization, it has been integrated in the pen the optical navigation sensor ONS instead of C sensor of threshold distance evaluation described in RO141297 and EP 1846868 patents. In the implementation example it was used an ADNS optical navigation sensor (AGILENT producer). The threshold distance detection function is taken over by the ONS sensor due to it's property to generate output data only when the captured image is focused sufficiently, in order for the sensor to analyze the pattern, respectively when the ONS sensor is to the paper that has the pattern p at a distance contained within a d interval determined by the optical properties of the lens L. In the implementation example this d interval is of 5-20 mm for a lens made of polycarbonate (Plexiglas) with a refraction coefficient n=1.5. ONS sensor is a self-referential sensor with the property of generating as output $d_x$, $d_y$ relative movements of the image projected by lens L on the sensitivity area, within a determined period of time (the sampling period). ($d_x$, $d_y$ movements correspond to the projection's movements of pattern's image printed on the paper. The image captured at the beginning of each sampling cycle represents the momentary reference to a pair of values $d_x$, $d_y$.

$d_x$, $d_y$ movements are estimated relatively to the self (X, Y) coordinates system of the ONS sensor. ONS sensor forms one piece with the entire plan-parallel topology of the MEMS accelerometers' axes (MEMS A and MEMS B—see RO 141297 and EP 1846868), integrated in the pen, according to topology in FIG. 5. In the example there were used inertial accelerometers with two axes, with an output range +/−2 g, with analogical output, from MEMS ADXL class (Analog Devices producer). MEMS have the same role as in the previous patent cited as reference, moreover, through the processing method that will be described, the variation of the signal's amplitude from the frequency band of over 150 Hz, corresponding to the microvibrations captured at the contact with the paper, will represent the input for the calligraphic interpretation/visualization of the trajectory made by ONS sensor integrated in the pen.

$d_x$, $d_y$ movements captured by ONS are evaluated by the sensor through the internal processing of multiple consecutive images captured during a sampling period, which lasts only a few milliseconds—in the implementation example, the sampling period of ONS sensor is of 2 ms. The processed images represent the projection of pattern P, printed on the writing paper/support, through lens L, on the sensor's photosensitive area. Topology represented in FIG. 5 (detailed in FIG. 6) makes the optimal link between three conditions: the alignment condition of x, y coordination/sensitivity axes of the three sensorial systems MEMS A, MEMS B and ONS, the non-intersection condition of the pen's peak with the visual field of the lens and the minimize condition of the navigation errors, caused by the dynamic inclinations during writing process. ONS sensor has maximum sensitivity for images captured in the near-infrared band. Therefore, the illumination of the pattern is made by IR LED with emission in the near-infrared band, placed as in FIG. 5, detail in FIG. 6.

A microcontroller µCA, which manages the synchronous sampling of both of the 4 accelerations generated by the MEMS sensors and the 2 $d_x$, $d_y$ movements, generated by ONS sensor, triggers the sampling cycle of a determined period of time.

At each moment n, in computer 2, the algebraic sum of the elements of $d_x(n)$, $d_y(n)$ series is made, which represent the approximation of the trajectory's projection of ONS sensor included in pen 1, through a plane curve, on the writing support, in the context of a dynamic and fluent execution of the signature, with liftings of the pen's peak from the paper/support within a focus maintaining interval (d=5-20 mm) of the pattern P image through lens L on the ONS sensor's photosensitive area.

The $d_x(n)$, $d_y(n)$ graphic signals set, together with $a_x(n)$, $a_y(n)$, $b_x(n)$, $b_y(n)$ digitized accelerations set, is transmitted by USB protocol through the specialized microcontroller µC-USB, included in the pen, towards computer 2, for acquisition, visualization, processing and signature comparison. The graphic data set has a constant periodicity, the well-determined intervals ensuring the phenomenological synchronism with the acceleration signals acquired via accelerometers MEMS A and MEMS B, the latter, in turn, having a constant periodicity, for instance: 1 mS. The writing plane/paper has printed a pattern P, with a quasi-uniform distribution. The role of this pattern is to be a source for the static reference points necessary to ONS sensor to compute $d_x$, $d_y$ pair of values which explains the relative movement of ONS sensor, performed during two consecutive readings. In the end, at the output of pen module 1, to a sampling cycle corresponds six signals, transmitted by USB protocol towards computer 2, respectively four acceleration signals:

$a_x(n)$—digitized signal generated by MEMS A on the x direction of the A point, $a_y(n)$—digitized signal generated by MEMS A on the y direction of the A point, $b_x(n)$—digitized signal generated by MEMS B on the x direction of the B point, $b_y(n)$—digitized signal generated by MEMS B on the y direction of the B point, and two movement signals: $d_x(n)$—signal generated by ONS on the x direction, $d_y(n)$—signal generated by ONS on the y direction. X, y directions correspond to the internal axes of MEMS and ONS sensors.

The system accomplishes the following specific functionalities:

it captures the trajectory projection of the writing device (electronic pen), in the context of performing a signature on writing paper or any other support with a similar texture that has printed a diffuse pattern P with a quasi-uniform distribution. This function is achieved through optical self-referential navigation sensor ONS, integrated into the pen with which the user/subject makes the signature. This functionality has dual utility: it generates the graphic information operated by the system in the algorithmic methods of decision on the signature's authenticity and it also generates the visual feedback, displayed on the system's monitor, essential for the user in the signature registration procedure or in the accommodation procedure with the system and visual validation by the subject of an acquisition that is to be authenticated;

it detects the beginning and the end of the signature by combined processing of two categories of signals: of movement, captured by ONS sensor, and those corresponding to the microvibrations captured by accelerometers MEMS A integrated in the pen. The method is based on the analysis of the frequency and amplitude parameters of the microvibrations that appear, along with the data about the self-referential trajectory of the pen, at the dynamic interaction of gesture-pen-paper fiber elements. This functionality is implemented as an algorithmic method, being contained in the application of the system, resident in computer 2;

it visualizes the pen's trajectory. This procedure takes place immediately, practically in real time, and, after processing, there are displayed also caligraphic effects (information) about the trajectory's thickness, similar to the graphic path made by pen's refill on the paper. This functionality has the role to provide the human subject with a visual feedback required for the acceptance of the acquisition made by the system. The algorithmic module, corresponding to the visualization functionality, is contained by the system's signature authentication application, resident in a computer, and the visualization takes place on the computer's monitor;

the multimodal processing and comparison of the acquired signals/forms is performed through algorithmic methods, described below, having as input elements the accelerations captured by MEMS and also the signals/forms captured by ONS sensor. The characteristics of algorithmic methods to function specifically in n-dimensional spaces (2D, 4D, 6D), with the six acquired signals, and the signals type (graphic and of acceleration) determines the multimodal character of system's methods. The pen and the methods used in the present invention are functionally and unitary associated, being realised as a module and a set of algorithmic methods contained in the application of the signature authentication system.

The method of caligraphic reconstruction of the writing thickness, displayed on the personal computer monitor 2, is implemented through the following steps that run in the personal computer 2:

In a first stage, for the calligraphic reconstruction of handwriting thickness, the trajectory is computed by the algebraic summing of the series of values of $d_x$ and $d_y$ signals obtaining the coordinates of momentary movements captured by optical navigation sensor ONS, trajectory that is reproduced graphically on the computer monitor 2.

In the second stage, it takes place the filtering of $a_x$ and $a_y$ accelerations, associated to a signature. Digitized $a_x$ and $a_y$ accelerations from MEMS A are filtered with a high pass filter with a cutoff frequency of 150 Hz, resulting $c_x$ and $c_y$ signals. Each of the $a_x$, $a_y$, $c_x$, $c_y$ signals is, in fact, sample vector represented as a positive integer number.

In the third stage, RMS $v_x(n)$ and $v_y(n)$ values are computed in a period of time (n–i, n) and the values obtained will be associated to time point n corresponding to the instantaneous values of $c_x$ and $c_y$ signals, as it follows:

$$v_x(n) = \sqrt{\frac{\sum_{i=0}^{35} c_x^2(n-i)}{36}} \text{ and } v_y(n) = \sqrt{\frac{\sum_{i=0}^{35} c_y^2(n-i)}{36}},$$

where $c_x(n)$ represents the n-th sample of the signal.

The resulting value $$\left(m(n) = \frac{v_x(n) + v_y(n)}{2}\right)$$

through the arithmetic average of the two effective values, $v_x(n)$ and $v_y(n)$, contains the information used to reconstruct the handwriting thickness. In the range of values of m(n) signal it is considered the interval [a, b], where a and b represent the minimum thickness, respectively the maximum thickness associated to the handwriting at a point in time. A and b values were experimentally determined.

In the fourth stage it is determined the situation where segments of trajectory, made when the pen is not in direct contact with the writing support, are eliminated from the initial graphic representation and it is also performed the thickness information association for the not eliminated segments of trajectory, thus achieving calligraphic interpretation. Therefore, if any of the values $v_x(n)$, $v_y(n)$ or $$\frac{v_x(n) + v_y(n)}{1.5}$$

are lower than a threshold value p, experimentally determined, it is considered that the thickness associated to handwriting at time n is 0. For time points when this condition is met, the segments, corresponding to the trajectory (FIG. 7), captured by pen 1, are deleted from the initial graphic representation (FIG. 8) displayed on computer monitor 2, thus obtaining a caligraphic representation similar to the one drawn by pen's refill on the writing support.

The present invention provides also the following methods of signature recognition: SRA3, SRA5, SRA7, SRA8 (SRA=System Recognition Algorithm), for the assessment of dynamic handwritten signature authentication, see FIG. 10.

These methods process the signals produced by the pen. In order to describe the processing algorithm, the signals generated by the pen are marked as it follows:

$a_x$: signal generated by MEMS A on the x direction of the A point;

$a_y$: signal generated by MEMS A on the y direction of the A point;

$b_x$: signal generated by MEMS B on the x direction of the B point;

$b_y$: signal generated by MEMS B on the y direction of the B point;

$d_x$: signal generated by ONS on the x direction;

$d_y$: signal generated by ONS on the y direction.

Each signal is in fact a vector of samples represented as a positive integer numbers. This vector is a numerical representation of a waveform. All the vectors of the same signature have the same length (same number of samples).

These 4 methods are based on the following common principles:

Each method contains two modules (see FIG. 9)

a) Processing Input Data Module.

Through a series of operations, from the input data is extracted the representative information used to store the data regarding the sample signatures and to represent the data constituted by the input signatures (original or fake) that are to be recognized. The assembly of these operations shall be named Signature Conversion Method 3.

b) Signature Comparison Module Between Two Signatures— a sample signature and an input signature. The assembly of these operations shall be named Signature Comparison Method 4. The assembly formed by Signature Conversion Method and Signature Comparison Method shall be named Signature Recognition Method.

The conversion of input signals (made by the input data processing module) into a format that can be used in the comparison process encloses the following steps:

a) Converting the signature's signals in invariants.

b) Weighing the sequences of invariants.

The sample signatures are converted and stored in the signature database. Subsequently, when an input signature appears (original or fake), it is converted and compared with the signatures from the database, computing the distance between the input signature and sample signatures, thus establishing whether the input signature subject is the same with the sample signature subject.

The four mentioned methods are based on a general conversion method of various curves (approximated by line segments) into sequences of invariants, namely into sequences of elements that do not change in relation to frequency or signals' amplitude (when speaking about accelerations), or in relation to scale (when speaking about graphic signals).

SRA3 and SRA5 methods work with plane curves (two dimensions), SRA7 method works with curves represented in 6 dimensional space and SRA8 works with curves represented in four dimensional space (FIG. 10).

Firstly, it is described SRA3 method of work with plane curves.

The first step consists in the conversion of signals into invariants.

The curve (5), defined by (x, y) coordinates according to FIG. 11, represents $d_x$ and $d_y$ signals.

There are considered 3 consecutive points $T_i$, $T_{i+1}$, $T_{i+2}$ on this curve, having the coordinates $(x_i, y_i)$, $(x_{i+1}, y_{i+1})$, $(x_{i+2}, y_{i+2})$ where $i=1, 2, \ldots, n-2$, with n representing the total number of points, defining the figure. The values $x_i$, $x_{i+1}$, $x_{i+2}$ belong to the $d_x$ curve, and $y_i$, $y_{i+1}$, $y_{i+2}$ belong to $d_y$ curve.

The slope $p_i$ of the segment defined by $T_iT_{i+1}$ is determined relatively to the OX axis, according to the following algorithm:

If $x_{i+1} > x_i$ and $y_{i+1} = y_i$ then $p_i = 0$.
If $x_{i+1} > x_i$ and $y_{i+1} > y_i$ then $p_i = a\tan((y_{i+1}-y_i)/(x_{i+1}-x_i))$.
If $x_{i+1} = x_i$ and $y_{i+1} > y_i$ then $p_i = \pi/2$.
If $x_{i+1} < x_i$ and $y_{i+1} > y_i$ then $p_i = \pi/2 + a\tan((x_i-x_{i+1})/(y_{i+1}-y_i))$.
If $x_{i+1} < x_i$ and $y_{i+1} = y_i$ then $p_i = \pi$.
If $x_{i+1} < x_i$ and $y_{i+1} < y_i$ then $p_i = \pi + a\tan((y_i-y_{i+1})/(x_i-x_{i+1}))$.
If $x_{i+1} = x_i$ and $y_{i+1} < y_i$ then $p_i = 3*\pi/2$.
If $x_{i+1} > x_i$ and $y_{i+1} < y_i$ then $p_i = 2*a\tan((y_i-y_{i+1})/(x_{i+1}-x_i))$;
If $x_{i+1} = x_i$ and $y_{i+1} = y_i$ then $p_i = 0$.
(By a tan( ) is denoted the arctangent function.)

By analogy, the $p_{i+1}$ slope of the segment defined by $T_{i+1}T_{i+2}$ is computed relatively to the OX axis.

Then, it is considered that $T_{i+1}$ defines a new coordinates system $(X' T_{i+1} Y')$ and the orientation of the segment $T_{i+1}T_{i+2}$ referring to the new coordinates system is determined by computing:

$$r_i = |p_2 - p_1|.$$

Now there can be defined two codes:
$ca_i$=absolute orientation code
$cr_i$=relative orientation code The absolute orientation code, $ca_i$ is calculated by splitting the imaginary circle that would have its center in $T_{i+1}$, into $S_a$ sectors. These sectors are trigonometrically numbered:

$$ca_i = \mathrm{int}(p_{i+1}/(2*\pi/S_a))$$

(The notation int( ) means the integer part of the value.)
The $S_a$ value is experimentally determined (For example $S_a$ can be 8).

The relative orientation code, $cr_i$ will be obtained by splitting into $S_r$ sectors, the circle that would have it's center into $T_{i+1}$. The sectors are numerated beginning from the BX' axis, thus having:

If $p_{i+1} >= p_i$ then $cr_i = \mathrm{int}(r_i(2*\pi/S_r))$
If $p_2 < p_1$ then $c_r = S_r - 1 - \mathrm{int}(p/(2*\pi/S_r))$ In the end, the 2 codes are combined into a single invariant code, using the expression:

$$c_i = cr_i * S_a + ca_i$$

$S_r$ value is experimentally determined (for example $S_r = 145$).

It is determined a sequence of invariants by the described analysis of three consecutive points starting from each point of the curve.

The second step is to assign weights to invariants.

Since an invariant is defined using three consecutive points on the curve $(T_i, T_{i+1}, T_{i+2})$, it will be considered the "invariant length" $L_i$ $(i=1, 2, \ldots, n-2)$ as being:

$$L_i = \sqrt{(x_{i+1}-x_i)^2 + (y_{i+1}-y_i)^2} + \sqrt{(x_{i+2}-x_{i+1})^2 + (y_{i+2}-y_{i+1})^2}$$

$L_t$ is defined as being a "reference total length" and can be calculated using the expression:

$$L_t = \sum_{i=1}^{i=n-2} L_i$$

Now, the weight of each invariant $w_i$ may be established as being the ratio between the invariant length $L_i$ and the reference length $L_r$:

$$w_i = L_i / L_r.$$

Each invariant will be defined by the $(c_i, w_i)$ whose values can be packed into a single $C_i$ code using the expression:

$$C_i = c_i + w_i * S_a * S_r$$

The SRA5 method resembles by principle with the SRA3 method, by analyzing a given curve into 2-dimensional space. However there will be two curves analyzed as separate components. The first curve will be defined by $a_x$ and $a_y$ and the second one will be defined by $b_x$ and $b_y$. By doing this analysis, the curve corresponding to an acceleration (measured in A point or in B point), becomes a plane curve, having a time-independent representation, but having to be analyzed respecting the order given by the samples (the curve points) arrival in time.

The SRA7 method is now described using curves in a six dimensional space.

The first step consists in converting signals into invariants.

It is considered a curve defined by points in a six dimensional space (numbered 0, 1, 2, 3, 4, 5), and three consecutive points belonging to this figure $T_i$, $T_{i+1}$, $T_{i+2}$, having the coordinates:

$$T_i: (u_{i,0}, u_{i,1}, u_{i,2}, u_{i,3}, u_{i,4}, u_{i,5})$$

$$T_{i+1}: (u_{i+1,0}, u_{i+1,1}, u_{i+1,2}, u_{i+1,3}, u_{i+1,4}, u_{i+1,5})$$

$$T_{i+2}: (u_{i+2,0}, u_{i+2,1}, u_{i+2,2}, u_{i+2,3}, u_{i+2,4}, u_{i+2,5})$$

where $i=1, 2, \ldots, n-2$ is the total number of points determining the curve.

The values of $u_{i,0}$, $u_{i+1,0}$, $u_{i+2,0}$ belong to $a_x$ curve, the values of $u_{i,1}$, $u_{i+1,1}$, $u_{i+2,1}$ belong to $a_y$ curve, the values $u_{i,2}$, $u_{i+1,2}$, $u_{i+2,2}$ belong to $b_x$ curve, the values of $u_{i,3}$, $u_{i+1,3}$, $u_{i+2,3}$ belong to $b_y$ curve, the values $u_{i,4}$, $u_{i+1,4}$, $u_{i+2,4}$ belong to $d_x$ curve and the values $u_{i,5}$, $u_{i+1,5}$, $u_{i+2,5}$ belong to $d_y$ curve.

The angle $p_i$, constructed by the segment defined by $T_iT_{i+1}$ with the segment defined by $T_{i+1}T_{i+2}$, is determined according to the following algorithm:

Firstly, two values $s_1$ and $s_2$ are computed using the following formulae:

$$s_1 = (u_{i+1,0} - u_{i,0}) * (u_{i+2,0} - u_{i+1,0}) + (u_{i+1,1} - u_{i,1}) * (u_{i+2,1} - u_{i+1,1}) +$$
$$(u_{i+1,2} - u_{i,2}) * (u_{i+2,2} - u_{i+1,2}) + (u_{i+1,3} - u_{i,3}) * (u_{i+2,3} - u_{i+1,3}) +$$
$$(u_{i+1,4} - u_{i,4}) * (u_{i+2,4} - u_{i+1,4}) + (u_{i+1,5} - u_{i,5}) * (u_{i+2,5} - u_{i+1,5})$$

$$s_2^2 = ((u_{i+1,0} - u_{i,0})^2 + (u_{i+1,1} - u_{i,1})^2 + (u_{i+1,2} - u_{i,2})^2 +$$
$$(u_{i+1,3} - u_{i,3})^2 + (u_{i+1,4} - u_{i,4})^2 + (u_{i+1,5} - u_{i,5})^2) *$$
$$((u_{i+2,0} - u_{i+1,0})^2 + (u_{i+2,1} - u_{i+1,1})^2 + (u_{i+2,2} - u_{i+1,2})^2 +$$
$$(u_{i+2,3} - u_{i+1,3})^2 + (u_{i+2,4} - u_{i+1,4})^2 + (u_{i+2,5} - u_{i+1,5})^2)$$

If $s_2 \neq 0$ and $s_1 \geq 0$, then $p_i = \arccos(s_1/\sqrt{s_2})$.
If $s_2 \neq 0$ and $s_1 < 0$ then $p_i = \pi + \arccos(s_1/\sqrt{s_2})$.
If $s_2 = 0$ then $p_i = 0$.
Now it is to determine $c_i$, the code of the i-th invariant $$c_i = p_i/(2*\pi/S_r)$$

where the $S_r$ value can be experimentally determined (for example $S_r = 7$).

The second step is to assign a weight to each invariant.

Since an invariant is defined by three consecutive points on the curve, $T_i$, $T_{i+1}$, $T_{i+2}$, the "invariant length" $L_i$ (i=1, 2, ..., n-2) will be computed using the following expression:

$$L_i = \sqrt{(u_{i+1,0} - u_{i,0})^2 + (u_{i+1,1} - u_{i,1})^2 + (u_{i+1,2} - u_{i,2})^2 + (u_{i+1,3} - u_{i,3})^2 + (u_{i+1,4} - u_{i,4})^2 + (u_{i+1,5} - u_{i,5})^2} +$$
$$\sqrt{(u_{i+2,0} - u_{i=1,0})^2 + (u_{i+2,1} - u_{i+1,1})^2 + (u_{i+2,2} - u_{i+1,2})^2 + (u_{i+2,3} - u_{i+1,3})^2 + (u_{i+2,4} - u_{i+1,4})^2 + (u_{i+2,5} - u_{i+1,5})^2}$$

$L_t$ is defined as a reference total length according to the following expression:

$$L_t = \sum_{i=1}^{i=n-2} L_i$$

Now each invariant's weight $w_i$ is computed as being the ration between the invariant length $L_i$ and the reference total length $L_r$:

$$w_i = L_i/L_r$$

Each invariant will be represented by the ($c_i$, $w_i$) pair, whose values can determine a single $C_i$ code, using the following expression:

$$C_i = c_i + w_i * S$$

Where S is a value higher than $c_i$ (for example S=32768).

The SRA8 method is similar to SRA7 but it uses only 4 four dimensions given by $a_x$, $a_y$, $b_x$, $b_y$.

By using SRA3, SRA5, SRA7 and SRA8, the input signals are translated into invariant arrays, each of the invariants having a certain weight (or cost). To compare two signatures, according to a chosen algorithm, means to determine the distance between two strings of symbols, defined by the two signatures that are being compared. To compute this distance, the most suitable method is the "Levenshtein" algorithm. In the end, if the result (the Levenshtein distance) is D, then the distance to be taken into account (normalized) d, will be:

$$d = 1 - \frac{D}{\sum_i cost_i + \sum_j cost_j}$$

where $cost_i = w_i$, and $cost_j = w_j$, represent the costs of the invariants of the two components.

The invention claimed is:

1. A system for acquiring and processing data associated with a dynamic handwritten signature, made on a writing paper support or any other support with similar texture having a quasi-uniform pattern printed thereon, the system comprising:
an electronic pen comprising two groups of inertial acceleration sensors that capture kinetic data and data about contact microvibrations with the writing support; and
an integrated personal computer for the acquisition and processing of the signals associated with the signatures, which can be network connected together with other personal computers, each personal computer having connected as peripherals an electronic pen, the electronic pen further comprising:
a self-referential optical navigation sensor that captures a series of data pairs ($d_x$, $d_y$), as momentary movements necessary for a reconstruction of a trajectory of the electronic pen, which, together with the kinetic data ($a_x$, $a_y$, $b_x$, $b_y$) captured by the set of inertial acceleration sensors constitute personal computer input data for sensorial fusion processing and for creating conditions to extract information from the sensorial and psychomotric representation of a user's perspective;
an infrared LED to illuminate the pattern;
a lens that focuses and projects a current image of the pattern on a sensitive area of the optical navigation sensor,
wherein the lens is positioned so that the projection of a pattern region image is obtained on the sensitive area of the optical navigation sensor,
wherein a condition of spatio-temporal synchronism required for the acquisition through sensorial fusion of the series of data pairs $d_x$, $d_y$, of a graphic type, and kinetic data $a_x$, $a_y$, $b_x$, $b_y$ is achieved by:
axial and topological quasi-alignment of three origins of coordinate axes of the set of inertial acceleration sensors, of the optical navigation sensor, and of a refill tip of the electronic pen;
topological plane-parallel quasi-alignment of coordinate/sensitive axes of the set of inertial acceleration sensors and of the optical navigation sensor with a writing plane; and
sampling the data captured by the set of inertial acceleration sensors and the optical navigation sensor, at a constant rate ranging between 1-8 ms, which assures, through high frequency, a time synchronism of the acquisition of graphic and kinetic details, the acquisition being controlled by an acquisition microcontroller that sends the information in real time to the personal computer that hosts algorithmic methods for visualization, for writing thickness reconstruction, and for processing and comparison, and
wherein, in order to capture the data from the psychometric and sensorial representation from the user's perspective, the set of inertial acceleration sensors and the optical navigation sensor, integrated in the electronic pen handled by the user, capture the six associated signals $a_x$, $a_y$, $b_x$, $b_y$, $d_x$, $d_y$ in self-referential coordinate systems, which are the x, y co-ordinates axes of sensitivity.

2. A method of assessing a dynamic handwritten signature authentication, the method consisting of:
- acquiring a signature using the system claimed in claim 1;
- determining characteristics of the signature;
- comparing the characteristics of the signature with those stored in a database; and
- combining the comparison results in order to assess the handwritten signature authentication,
- wherein, in the acquiring step, a calligraphic reconstruction and a writing thickness visualization based on the signals $a_x$, $a_y$, $b_x$, $b_y$, $d_x$, $d_y$ are performed, and
- wherein, in the determining step, various processing of the signals $a_x$, $a_y$, $b_x$, $b_y$, $d_x$, $d_y$ associated with the signature into a sequence of invariants $C_i$ is performed.

3. The method according to claim 2, wherein the calligraphic reconstruction of handwriting thickness comprises the steps of:
- calculating a trajectory by an algebraic summing of a series of values of the signals $d_x$ and $d_y$, thus obtaining coordinates of momentary movements captured by an optical navigation sensor,
  - wherein the trajectory is graphically reproduced on a personal computer monitor;
- filtering digitized signals $a_x$ and $a_y$ from an electronic pen with a high pass filter with a cutoff frequency of 150 Hz, thus resulting in two signals $c_x$ and $c_y$;
- computing a RMS value in a time period [n−i, n] of i consecutive values, experimentally established, and incrementing with 1 after each stage of calculation, thus obtaining $v_x(n)$ and $v_y(n)$ signals, which, in turn, are arithmetically mediated for each incremental step, thus resulting in a m(n) signal proportional with the writing thickness;
- determining a situation where segments of the trajectory are eliminated from an initial graphic representation, corresponding to zero thickness, by verifying a condition according to which any of the $v_x(n)$, $v_y(n)$ or $$\frac{v_x(n) + v_y(n)}{1,5}$$

values are lower than a threshold value p, which is experimentally determined, when the electronic pen is not in direct contact with a writing support; and
- thereafter performing an association of thickness information to non-eliminated segments of the trajectory, thus achieving calligraphic interpretation of the handwriting.

4. The method according to claim 2, named SRA3, wherein the sequence of invariants $C_i$ is obtained starting from conversion of the signals $d_x$ and $d_y$, which are momentary movements of the input signature that describe one plane curve.

5. The method according to claim 4, named SRA5, wherein the sequence of invariants $C_i$ is obtained starting from conversion of both the signals $a_x$, $a_y$, and respectively, the signals $b_x$, $b_y$ of the input signature, which describe two plane curves.

6. The method according to claim 2, named SRA7, sequence of invariants $C_i$ is obtained starting from conversion of all of the signals $a_x$, $a_y$, $b_x$, $b_y$, $d_x$, $d_y$ of the input signature, which describe one curve in six dimensional space.

7. The method according to claim 6, named SRA8, sequence of invariants $C_i$ is obtained starting from conversion of the signals $a_x$, $a_y$, $b_x$, $b_y$ of the input signature, which describe one curve in a four dimensional space.

* * * * *